2,821,555

1-BROMO-2,3-BUTANEDIONE AND ITS 3-OXIME DERIVATIVE

Mona Phyllis Doerner, Walnut Creek, Calif., assignor to The Dow Chemical Company, Midland, Mich., a corporation of Delaware No Drawing. Application January 7, 1957
Serial No. 632,655

2 Claims. (Cl. 260—566)

The present invention is directed to a new and improved method for the synthesis of 1-bromo-2,3-butanedione and its 3-oxime derivative. These compounds have the following formulae

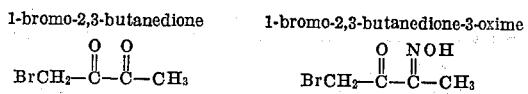

1-bromo-2,3-butanedione is valuable as an intermediate for the preparation of 1-bromo-2,3-butanedione-3-oxime, while the latter compound is useful as an intermediate for the preparation of more complex organic derivatives. 1-bromo-2,3-butanedione-3-oxime also has herbicidal and bactericidal properties and is useful as an active toxicant constituent of fungicidal compositions. This utility is illustrated by the activity observed for compositions of the oxime compound wherein an aqueous solution of the compound at the concentration of 200 parts by weight per million parts of solution gave a 100 percent control of the organism Rhizoctonia sp.

As a result of a study reported in Liebig's Annalen der Chemie, 249, 182–214 (1888), Fittig, Daimler and Keller came to the conclusion that the compound, 1-bromo-2,3-butanedione, does not exist (p. 207). This conclusion was later reaffirmed by Diels and Farkas, Berichte der Deutschen Chemischen Gesellschaft, 43, 1957–1961 (1910). However, it has now been discovered that this compound does exist and may be prepared by a new and useful process.

According to the new process, bromine is reacted with 2,3-butanedione to produce 1-bromo-2,3-butanedione. The 1-bromo-2,3-butanedione may then be separated by distillation and reacted with hydroxylamine to produce 1-bromo-2,3-butanedione-3-oxime.

In the preparation of 1-bromo-2,3-butanedione, it is essential and critical that one molecular proportion of bromine be introduced portionwise into at least 1.4 molecular proportions of 2,3-butanedione which is maintained at a temperature of from 0° to 30° C. A larger proportion of the 2,3-butanedione reagent may be employed but is undesirable from the standpoint of economy. A proportion somewhat smaller than 1.4 moles per mole of bromine materially affects the course of the reaction and should not be employed if it is desired to obtain the 1-bromo-2,3-butanedione intermediate as a major product of reaction. Thus, the bromine is introduced portionwise into 2,3-butanedione, the addition being discontinued before the amount of added bromine reaches more than one molecular proportion for each 1.4 molecular proportions of 2,3-butanedione originally present.

The temperature at which the bromination is carried out should be maintained at or below 30° C. and preferably at from 10° to 30° C. The reaction takes place smoothly under the described temperature conditions with the evolution of hydrogen bromide. The reaction is somewhat exothermic and cooling is employed as well as careful control of rate of introduction of the bromine to avoid overheating. Temperatures significantly in excess of 30° C. should not be employed as they materially decrease the yield of the 1-bromo-2,3-butanedione.

Upon completion of the bromination reaction, the reaction mixture may be fractionally distilled under reduced pressure to separate the desired 1-bromo-2,3-butanedione. This product is a viscous yellow liquid which has a tendency to decompose when standing at room temperature. Accordingly, the product should not be maintained at room temperature for periods longer than about twenty-four hours.

For the preparation of 1-bromo-2,3-butanedione-3-oxime, it is critical that prior to decomposition of the 1-bromo-2,3-butanedione, the hydroxylamine is introduced portionwise into at least an equimolar amount of the separated 1-bromo-2,3-butanedione which is maintained under acidic conditions and at a temperature of from 0° to 20° C. In this step, optimum yields are obtained when employing substantially equimolecular proportions of the reagents. A significantly larger proportion of the hydroxylamine is not desirable since it materially reduces the yield of the desired oxime and results in the formation of other reaction products. An excess of the 1-bromo-2,3-butanedione may be employed but such procedure is uneconomical.

The temperature of the 1-bromo-2,3-butanedione is kept at or below 20° C. and preferably at from 0° to 10° C. during the addition of the hydroxylamine. The reaction is somewhat exothermic and the temperature may be controlled by regulation of the rate of adding the hydroxylamine and by external cooling. Agitation of the reaction mixture is desirable to avoid local overheating as well as occlusion of the reactants in the monoxime product as precipitated. Temperatures substantially in excess of 20° C. should not be employed as they reduce the yield of the monoxime.

For the synthesis of the 1-bromo-2,3-butanedione-3-oxime it is essential that the reaction between the hydroxylamine and the separated 1-bromo-2,3-butanedione be carried out under acidic conditions and preferably at a pH of from 2.0 to 6.0. Such a pH may be obtained by incorporating in the reaction mixture the required amount of an acid or acid reacting reagent which does not interfere with the course of the reaction, e .g. HCl. Alkaline conditions in the reaction mixture are undesirable as they materially reduce the yield of the desired oxime product.

In carrying out the reaction between 1-bromo-2,3-butanedione and hydroxylamine, the latter agent may be prepared from the reaction of combining amounts of a hydroxylamine salt such as hydroxylamine hydrochloride, hydroxylamine sulfate and hydroxylamine acid sulfate and an alkali metal salt or hydroxide such as sodium carbonate, sodium hydroxide, potassium hydroxide, sodium acid carbonate and sodium acetate. In such procedure the hydroxylamine salt and alkali metal hydroxide or salt are mixed together in water as reaction solvent. The aqueous solution of hydroxylamine is added portionwise under suitable reaction conditions to the 1-bromo-2,3-butanedione to effect the desired reaction. The aqueous hydroxylamine solution to be employed preferably should not contain any excess alkali as such alkali would interfere with the maintenance of acidic conditions in the reaction zone. Upon completion of the reaction, the reaction mixture may be filtered to separate a 1-bromo-2,3-butanedione-3-oxime product as a crystalline solid. In an alternative procedure, the reaction mixture may be extracted with a solvent such as benzene or methylene dichloride. Following recovery of the solvent by fractional distillation, the 1-bromo-2,3-butanedione-3-oxime product is obtained as a residue.

In a representative operation, 640 grams (4 moles) of bromine was added dropwise with stirring and cooling to 517 grams (6 moles) of 2,3-butanedione. The addition was carried out over a period of one hour and at a temperature of from 20° to 30° C. Following the addition, the reaction mixture was blown with air for 30 minutes to drive off any dissolved hydrogen bromide. The residue was then fractionally distilled under reduced pressure to separate a 1-bromo-2,3-butanedione product as a viscous yellow liquid boiling at 54° C. at 4.1 millimeters pressure. 336.9 grams of the latter product was obtained which corresponds to a yield of 51 percent.

About one hour following the preparation of the above 1-bromo-2,3-butanedione compound, a mixture of 128.5 grams (1.85 moles) of hydroxylamine hydrochloride and 79.5 grams (0.75 mole) of sodium carbonate in 700 milliliters of water was added portionwise to 305.0 grams (1.85 moles) of the above prepared 1-bromo-2,3-butanedione dispersed in 500 milliliters of water. The addition was carried out with stirring and cooling and at a temperature of from 0° —10° C. and a pH of from about 4 to 6. During the addition, a 1-bromo-2,3-butanedione-3-oxime product precipitated in the reaction mixture. Following the addition, which was completed in about 15 minutes, the mixture was maintained for about 30 minutes at a temperature of from 0° to 10° C. to complete the reaction. The reaction mixture was then extracted with methylene dichloride. Following evaporation of a portion of the solvent from the solvent extract, the 1-bromo-2,3-butanedione-3-oxime precipitated therein as a crystalline solid. The latter was separated by filtration and dried. 276 grams of dried oxime was obtained which corresponds to a yield of 83 percent. 1-bromo-2,3-butanedione-3-oxime is a crystalline solid melting at 86°–87° C.

This application is a continuation-in-part of my copending application Serial No. 490,109, filed February 23, 1955, and now abandoned.

I claim:

1. A method which comprises the step of introducing portionwise bromine into 2,3-butanedione which is maintained at a temperature of from 0° to 30° C. and discontinuing said addition before the amount of added bromine reaches more than one molecular proportion for each 1.4 molecular proportions of 2,3-butanedione originally present, thereby to produce 1-bromo-2,3-butanedione.

2. A method for the preparation of 1-bromo-2,3-butanedione-3-oxime which comprises the steps of (1) introducing portionwise bromine into 2,3-butanedione which is maintained at a temperature of from 0° to 30° C. and discontinuing said addition before the amount of bromine added reaches more than one molecular proportion for each 1.4 molecular proportions of 2,3-butanedione originally present, thereby to produce a 1-bromo-2,3-butanedione intermediate, (2) recovering said intermediate by distillation when the reaction has subsided, and (3) prior to decomposition of the 1-bromo-2,3-butanedione, introducing hydroxylamine portionwise into at least an equimolar amount of the separated intermediate which is maintained under acidic conditions and at a temperature of from 0° to 20° C.

No references cited.